United States Patent [19]
Wilkes

[11] 3,873,405
[45] Mar. 25, 1975

[54] MULTI-IMAGE FILM MASK

[76] Inventor: Frederick Alfred Wilkes, P.O. Box 695, Station N, Montreal, Quebec, Canada

[22] Filed: Sept. 22, 1971

[21] Appl. No.: 182,670

[52] U.S. Cl. ............ 161/113, 40/158 R, 40/158 B, 156/108, 156/252, 156/514, 161/109, 161/112, 161/167, 161/406
[51] Int. Cl. .......................................... G03b 21/64
[58] Field of Search ........... 161/109, 110, 112, 406, 161/113, 36, 167; 156/108, 514, 252; 40/158 B, 158 R

[56] References Cited
UNITED STATES PATENTS

| 855,121 | 5/1907 | McCormick | 40/158 B |
| 2,291,173 | 7/1942 | Simpson | 40/158 B |
| 2,292,312 | 8/1942 | Wittel et al. | 40/158 B |
| 3,264,154 | 8/1966 | Kiehl | 156/108 |
| 3,470,644 | 10/1969 | Craig | 40/158 R |
| 3,536,555 | 10/1970 | Thompson, Jr. | 156/108 |
| 3,558,388 | 1/1971 | Somerville | 156/108 |
| 3,687,770 | 8/1972 | Chase | 156/108 |
| 3,737,364 | 6/1973 | Heindl, Jr. | 161/406 |

*Primary Examiner*—George F. Lesmes
*Assistant Examiner*—Charles E. Lipsey

[57] ABSTRACT

A film mask adapted to retain one or more discrete film images. The mask comprises a flat body member having one or more apertures therein. The body member is provided with a reflective surface which is non-transmitting to heat and light. The opposite surface of the body member is provided with an adhesive to secure one or more discrete film images for viewing through a respective one of the apertures.

2 Claims, 6 Drawing Figures

PATENTED MAR 25 1975　　3,873,405

MULTI-IMAGE FILM MASK

BACKGROUND OF THE INVENTION

1. Field of the Invention

The present invention relates to a multi-image film mask adapted for mounting in transparent film mounts.

2. Description of the Prior Art

Transparent slide mounts heretofore known are of various type construction. Some of the most commonly known are those in which a picture frame from a film strip is retained between two pieces of cardboard having an aperture therethrough, through which the slide can be viewed and projected. Another commonly known slide mount is the glass mount type where a picture frame from a film strip is secured along the edges to a mask. The film may be secured by glueing the edges of the film onto the mask or by inserting the edges of the film in integral lips provided in the mask. The mask and film are then sandwiched between two glass plates which preserves the film and keeps it flat for projection. The glass plates are held together in a channel member or taped together along their edges.

Heretofore, the abovementioned type of slide mounts have been used for the projection of a single frame of film, which film frame is affixed to an apertured mask adapted for direct use in film projectors or for mounting in transparent slide mounts.

SUMMARY OF THE INVENTION

It is a feature of the present invention to provide a film mask adapted to retain two or more discrete film clippings whereby two or more images can be mounted in a standard slide mount and projected simultaneously.

It is another feature of the present invention to provide a multi-image film mask comprising a multi-apertured body having a reflecting surface on one side thereof and an adhesive surface, of the medium aggressive type, on the outer surface thereof, and a detachable wax coated paper overlying said adhesive surface.

A still further feature of the present invention is to provide a plurality of grid lines on the adhesive side of the mask body and associated with each aperture whereby the image on a film clipping can be aligned relative to a reference horizon on the images with the lines associated with the apertures.

Yet another feature of the present invention is to provide a film mask to achieve creative photography and permitting editing of a sequence of images in a single still projection.

A further feature of the invention is to provide a transparent slide mount for projecting multi-images by the transmission of light therethrough, comprising a multiapertured mask having a surface thereof which is light reflective and the opposed surface having an adhesive of the medium aggressive type for retaining two or more film clippings, each film clipping being secured for registry and projection through an associated aperture, a pair of transparent plates retain the mask and adhered film clippings therebetween and a frame for securing the transparent plates coextensive to each other.

A still further feature is to provide a film mask which is relatively simple to manufacture and very economical.

From an economical point of view, another feature is that there is a substantial reduction in the number of slide mounts and trays required to project a plurality of images. Since projection trays can only take a predetermined number of film slides, the capacity of such trays has been more than doubled by projecting at least two images with every slide.

According to the above features, from a broad aspect the present invention provides a film mask adapted to retain one or more discrete film images. The mask comprises a flat body member having one or more apertures therein. The body member has a reflective surface which is non-transmitting to heat and light. The opposite surface of the body member is provided with an adhesive to secure one or more discrete film images for viewing through a respective one of the apertures.

BRIEF DESCRIPTION OF THE DRAWINGS

The invention will now be described with reference to the embodiments as illustrated by the accompanying drawings in which.

DESCRIPTION OF THE PREFERRED EMBODIMENTS

Figure 1A:
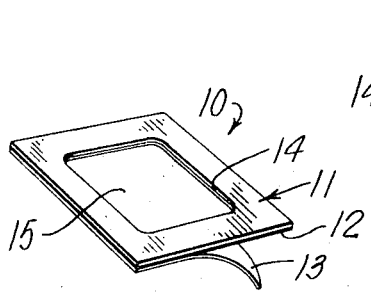
FIG. 1a. is a perspective view of a film mask structure according to the present invention.
Figure 1B:
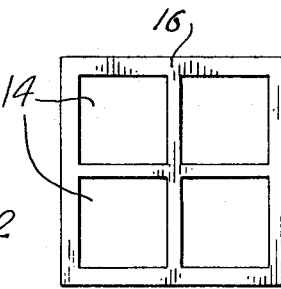
FIGS. 1b – 1e are plan views of film masks having different aperture configurations.

Referring now to the drawings and more particularly to FIG. 1(a), there is shown, generally at 10, the film mask of the present invention. The mask 10 consists of a flat body member 11 constructed of a paperboard, plastic or any suitable material. An adhesive 12, of the medium aggressive type, is provided on a surface of the body 11. A wax coated material 13 or the like, generally paper, is detachably adhered over the adhesive 12 to protect it before usage. When a film clipping 25 (see FIG. 2) is to be affixed to the adhesive 12, the wax coated paper 13 is easily peeled off due to the medium aggressiveness of the adhesive. Since the wax side of the paper is in registry with the adhesive 12, it peels off very easily without removal of the adhesive 12. The surface 16 of the body 11 is coated with a reflective material such as a polish silvery coating which is not penetrable by light and which will not absorb heat which may cause the adhesive to melt and damage the film.

An aperture 14 is provided through the body 11 of the mask 10 for viewing and projection of the image on the film clipping 25 associated with the aperture. The body 11 can be provided with apertures, such as 14, stamped through to define removable apertured area sections 15 retained in the plane of the body. Thus, no irregularities in the periphery of the apertures 14 are present when the sections 15 are removed, otherwise such irregularities as these would be magnified during projection of the image.

Figure 1C:
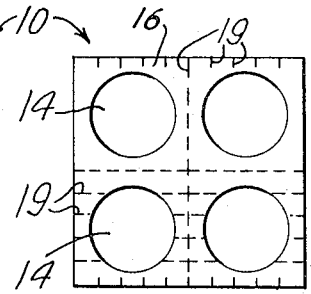
Figure 1D:
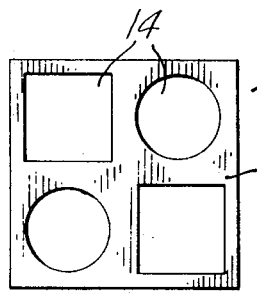
Figure 1E:
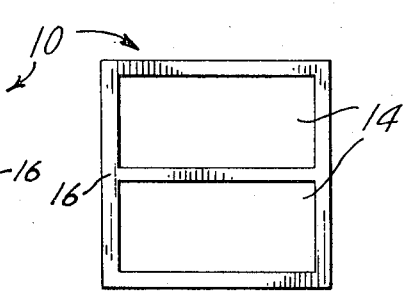

Referring to FIGS. 1(b) to 1(e), there is shown the film mask 10 having two or more apertures therein for projecting multi-images and to permit editing. The size of the apertures 14 of FIG. 1(b) for example, makes it possible to cut-out two sections from a single frame of 35 m.m. film to affix in registry against two of these apertures 14. In FIG.1(e) the apertures 14, are of such size as to permit two 35 m.m. slides to be cropped and affixed to mask 10. FIG. 1(d) shows apertures 14 of different configuration.

FIG. 1(c) shows an embodiment in which grid markings 19 are provided across or on the edges of the adhesive surface. The vertical and horizontal grid lines 19 provide for the alignment of the images on the film clippings 25 (see FIG. 2) whereby all images projected have their horizons or parallel lines substantially in parallel planes.

Figure 2:
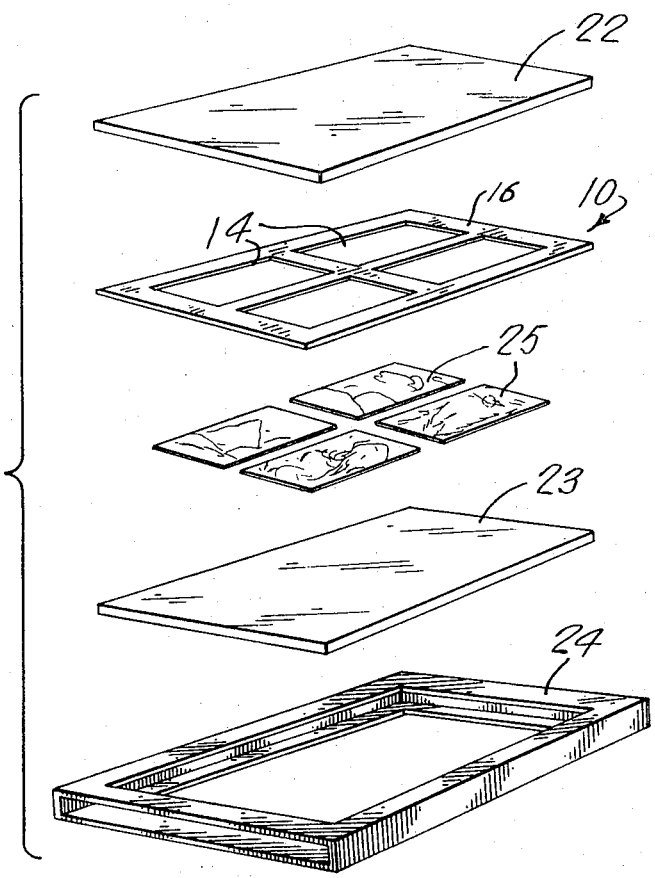
FIG. 2 is an exploded perspective view of a film mask and an associated transparent film mount.

Referring now to FIG. 2 there is shown one form of method of use of the mask 10 in a film mount. Pieces of film clippings 25, each having a surface slightly larger than the area of an aperture 14, are placed in registry with a respective aperture and pressed against the adhesive surface 12 whereby the clippings 25 are held in position along their edges. If one of the apertures is not utilized it can be blanked by a piece of silver paper or the apertured area section 15 maintained in the plane of the body 11, as described hereinabove. A top and bottom glass plate, 22 and 23 respectively, are positioned coextensively each on a respective side of the mask 10 to secure the mask 10 in a flat plane therebetween. This assembly is then secured in a frame 24 adapted for use in standard type projectors.

Other advantages of the film mask of the present invention is that it provides a simple, economical visual aid to be utilized in preparing photographic slides for group encounter, motivation in schools, churches, industry.

The present invention should also encourage hobbyists of all ranks, children as well as adults in creative story telling, creative photography and creative editing involved in a novel means of expression by hundreds of picture combinations - ideas can be presented simultaneously for comparison, in juxtaposition for contrast, giving the message more clearly and vividly. It gives more scope for close-up photography and provides for a sophisticated variety of images, combined with other slides. It provides an effect of economy, reduces the monotony of a one slide at a time projection. In short, it enables one to learn more in less time.

Another advantage is that one projector can provide a multi-image presentation, when a portion of the slides are made up with the masks. By using two or more projectors on one or more screens, that is, slide projectors alone, slide projectors combined with film strip projections, over-head projections or movies will, with proper editing and sound, provide an unusually educational, entertaining or motivational presentation that can be produced by people with very little skill in photography.

I claim:

1. A film mask having two or more discrete film apertures therein and adapted for use in a projectable film slide mount having a single projectable area capable of retaining said film mask in a flat plane therein, said mask comprising a flat body member of pliable paperboard material, said two or more apertures in said film mask being stamped through said body member within a single projectable area and each defining an aperture area section which is retained in the plane of said body whereby substantially no visible irregularities in the periphery of said apertures can be detected when said aperture area sections are removed, said body member having a reflective surface which will not absorb heat and which is non-transmitting to light, the opposite surface of said body having an adhesive thereon to secure the marginal edges of two or more discrete film images about a respective aperture for viewing two or more images on said film mask, said opposite surface having an adhesive thereon further including grid markings at least along one plane of said body whereby said one or more film images can be aligned in parallel planes, said opposite surface of said mask having a waxy coated protective paper sheet detachably adhered to said adhesive surface.

2. A film mask as claimed in claim 1 wherein said adhesive is a medium aggressive adhesive permitting said paper sheet to be detached from said adhesive and wherein said protective material is wax coated on its surface in contact with said adhesive, said adhesive permitting said protective material to be peeled off without removal of the adhesive from said body.

* * * * *